US012792087B2

(12) United States Patent
Mi et al.

(10) Patent No.: US 12,792,087 B2

(45) Date of Patent: Nov. 10, 2026

(54) FOLDABLE DISPLAY PANEL AND METHOD FOR PREPARING FOLDABLE DISPLAY PANEL

(71) Applicant: Hefei Visionox Technology Co., Ltd., Hefei (CN)

(72) Inventors: Lei Mi, Hefei (CN); Yusheng Liu, Hefei (CN); Hongrui Li, Hefei (CN)

(73) Assignee: Hefei Visionox Technology Co., Ltd., Hefei (CN)

(*) Notice: Subject to any disclaimer, the term of this patent is extended or adjusted under 35 U.S.C. 154(b) by 429 days.

(21) Appl. No.: 18/342,034

(22) Filed: Jun. 27, 2023

(65) Prior Publication Data

US 2023/0333590 A1 Oct. 19, 2023

Related U.S. Application Data

(63) Continuation of application No. PCT/CN2022/084690, filed on Mar. 31, 2022.

(30) Foreign Application Priority Data

Jul. 30, 2021 (CN) ......................... 202110873925.7

(51) Int. Cl.
*G06F 1/16* (2006.01)
*H04M 1/02* (2006.01)

(52) U.S. Cl.
CPC ........ *G06F 1/1616* (2013.01); *H04M 1/0216* (2013.01)

(58) Field of Classification Search
CPC ........................... G06F 1/1616; H04M 1/0216
See application file for complete search history.

(56) References Cited

U.S. PATENT DOCUMENTS 10,520,978 B1* 12/2019 Li ......................... G06F 1/1683
2017/0194409 A1* 7/2017 Jeong ................... H10K 59/123
(Continued)

FOREIGN PATENT DOCUMENTS

CN 108648631 A 10/2018
CN 108766979 A 11/2018
(Continued)

OTHER PUBLICATIONS

Office Action issued on Sep. 2, 2022, in corresponding Chinese Application No. 202110873925.7, 17 pages.
(Continued)

*Primary Examiner* — Jeff W Natalini
*Assistant Examiner* — Jacob Raul Marin
(74) *Attorney, Agent, or Firm* — Maier & Maier, PLLC

(57) ABSTRACT

A foldable display panel and a method for preparing the foldable display panel. The foldable display panel includes a foldable area and a plurality of non-foldable areas located at both sides of the foldable area in a width direction of the foldable display panel. The foldable display panel includes: a plurality of pixel groups, including a plurality of first pixel groups located in the foldable area and a plurality of second pixel groups located in the plurality of non-foldable areas; a plurality of driver circuits located in the plurality of non-foldable areas and for driving the plurality of pixel groups. The plurality of driver circuits include a plurality of first driver circuits for driving the plurality of first pixel groups and a plurality of second driver circuits for driving the plurality of second pixel groups.

19 Claims, 8 Drawing Sheets

(56) References Cited

U.S. PATENT DOCUMENTS

| | | | | |
|---|---|---|---|---|
| 2017/0308196 | A1* | 10/2017 | Jeong | H10K 59/131 |
| 2018/0040680 | A1* | 2/2018 | Cai | H10K 77/111 |
| 2018/0239209 | A1* | 8/2018 | Oka | G02F 1/1339 |
| 2019/0340959 | A1* | 11/2019 | Park | H10K 77/111 |
| 2021/0233455 | A1* | 7/2021 | Yang | G09G 3/2003 |
| 2021/0234117 | A1* | 7/2021 | Liang | H10K 59/122 |

FOREIGN PATENT DOCUMENTS

| | | | |
|---|---|---|---|
| CN | 109285463 | A | 1/2019 |
| CN | 110853517 | A | 2/2020 |
| CN | 111524902 | A | 8/2020 |
| CN | 109545801 | B | 2/2021 |
| CN | 112597849 | A | 4/2021 |
| CN | 113594222 | A | 11/2021 |

OTHER PUBLICATIONS

Office Action issued on Apr. 12, 2023, in corresponding Chinese Application No. 202110873925.7, 9 pages.

International Search Report issued on May 24, 2022, in corresponding International Application No. PCT/CN2022/084690, 4 pages.

* cited by examiner

FOLDABLE DISPLAY PANEL AND METHOD FOR PREPARING FOLDABLE DISPLAY PANEL

CROSS REFERENCE TO RELATED APPLICATIONS

The present application is a continuation of International Application No. PCT/CN2022/084690 filed on Mar. 31, 2022, which claims priority to Chinese patent application No. 202110873925.7, filed on Jul. 30, 2021 and entitled with "FOLDABLE DISPLAY PANEL, DISPLAY DEVICE AND METHOD FOR PREPARING FOLDABLE DISPLAY PANEL", both of which are incorporated herein by reference in their entireties.

TECHNICAL FIELD

The present application relates to the technical field of display devices, in particular to a foldable display device and a method for preparing the foldable display device.

BACKGROUND

With continuous development of technologies, a user has higher and higher requirements for a display device. How to increase a display area of a display device has become an important development direction for the display device. In order to increase the display area, one method is to maximize the display area as much as possible by narrowing its surrounding edges, i.e. provide a "full screen". After achieving the full screen, it seems impossible to further increase a screen area without changing a body size of the display device. Therefore, it is necessary to find another method. A concept of a foldable screen has begun to take shape, under which the body size in a folded state is small enough such that the display device can be placed into a pocket and the body size in an unfolded state equals to twice the original folded size. A foldable area of the foldable screen is not bending-resistant, and metal wirings in the foldable area are prone to fracture, so service life of the foldable screen is seriously affected.

SUMMARY

The embodiments of present application provides a foldable display device and a method for preparing the foldable display device, which are designed to improve service life of a foldable display device.

In a first aspect, the embodiments of the present application provides a foldable display device including a foldable area and a plurality of non-foldable areas located at both sides of the foldable area in a width direction of the foldable display panel. The foldable display device includes: a plurality of pixel groups, including a plurality of first pixel groups located in the foldable area and a plurality of second pixel groups located in the plurality of non-foldable areas; and a plurality of driver circuits located in the plurality of non-foldable areas and for driving the plurality of pixel groups, wherein the plurality of driver circuits include a plurality of first driver circuits for driving the plurality first pixel groups and a plurality of second driver circuits for driving the plurality of second pixel groups.

In a second aspect, the embodiments of the present application provide a display device, including the display panel according to any one of the embodiments in the first aspect of the present application.

In a third aspect, the embodiments of the present application provide a method for preparing a foldable display device including a foldable area and a plurality of non-foldable areas located at both sides of the foldable area, the method including: preparing a first inorganic insulation layer located on a substrate; preparing a driver device layer located on the first inorganic insulation layer, wherein driver device layer includes a plurality of first through holes in the foldable area and a plurality of driver circuits in the plurality of non-foldable areas, wherein at least a part of the first inorganic insulation layer is exposed by the plurality of first through holes; patterning the first inorganic insulation layer to form a plurality of second through holes in the foldable area, wherein the plurality of second through holes and the plurality of first through holes are interconnected; preparing a first flattened layer on the driver device layer, wherein at least a part of the first flattened layer are filled in the plurality of first through holes and the plurality of second through holes; and preparing a connection line layer on the first flattened layer, wherein the connection line layer includes first connection lines for connecting a portion of the driver circuits.

BRIEF DESCRIPTION OF THE DRAWINGS

By reading the detailed description of non-limiting embodiments with reference to the accompanying drawings below, other features, objectives and advantages of the present application will become more apparent, where identical or similar reference numerals represent identical or similar features.

DETAILED DESCRIPTION

Features and exemplary embodiments of various aspects of the present application will be described in detail. In the detailed description below, many specific details are proposed to provide a comprehensive understanding of the present application. However, it is evident to those skilled in the art that the present application can be implemented without need for some of these specific details. The description of the embodiments below is only intended to provide a better understanding of the present application by showing examples of the present application. In the accompanying drawings and the following description, at least some well-known structures and techniques are not shown in order to avoid unnecessary ambiguity to the present application. Moreover, for clarity, dimensions of some structures may have been exaggerated. In addition, the features, structures, or characteristics described below can be combined in one or more embodiments in any suitable manner.

In order to better understand the present application, a foldable display panel, a display device and a method for preparing the foldable display panel according to the embodiments of the present application will be described in detail in conjunction with FIGS. 1 to 12.

Figure 1:
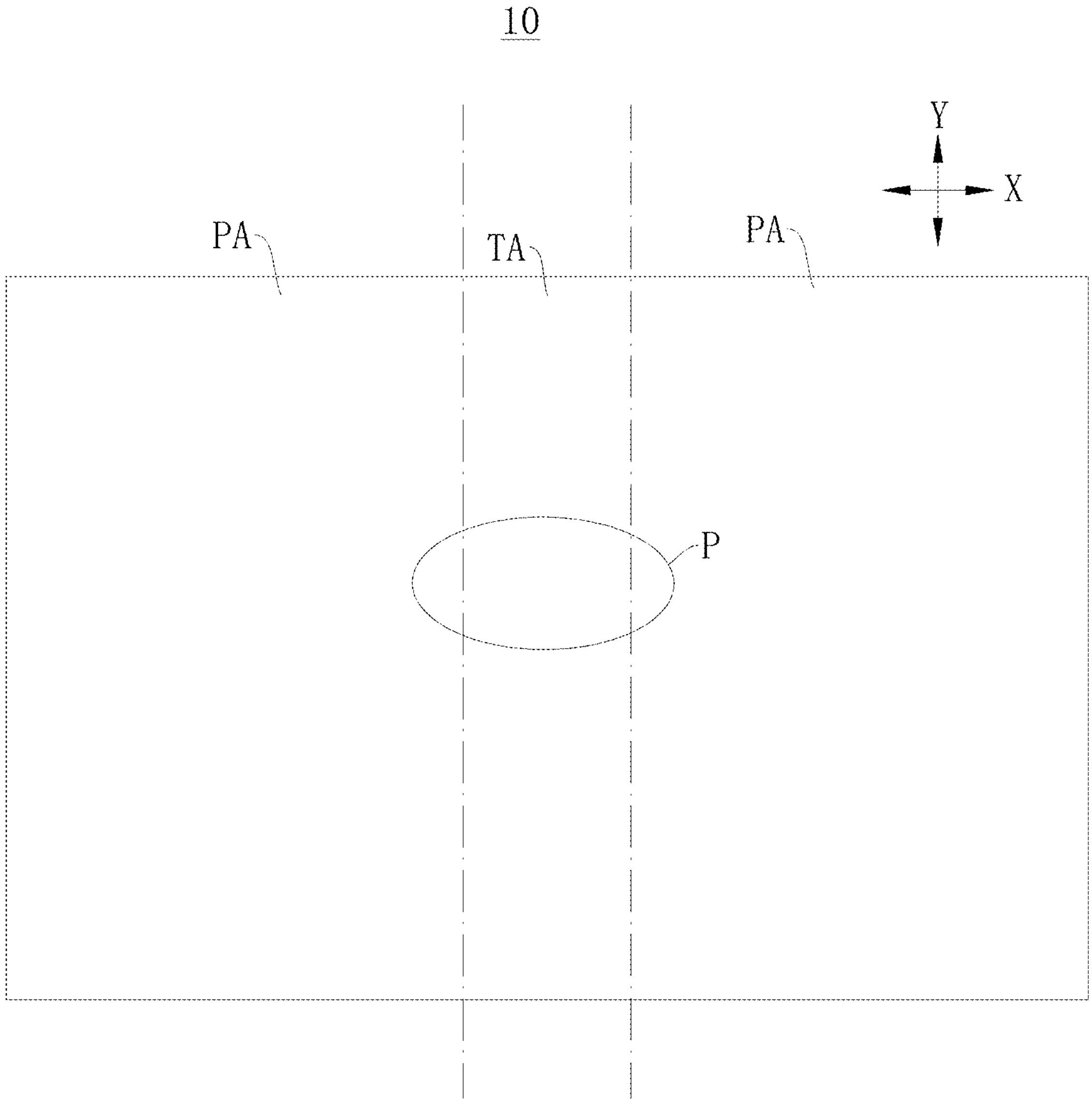
FIG. 1 is a structural schematic diagram of a foldable display panel in an unfolded state according to an embodiment in a first aspect of the present application.
Figure 2:
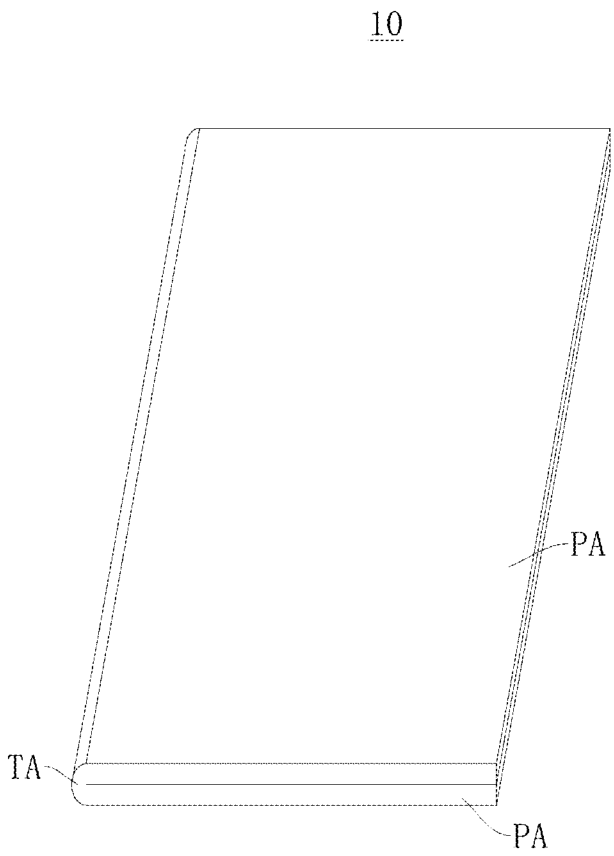
FIG. 2 is a structural schematic diagram of a foldable display panel in a folded state according to an embodiment in the first aspect of the present application.

Please refer to FIGS. 1 and 2, FIG. 1 is a structural schematic diagram of a foldable display panel 10 in an unfolded state according to an embodiment in a first aspect of the present application; and FIG. 2 is a structural schematic diagram of a foldable display panel 10 in a folded state according to an embodiment in the first aspect of the present application.

As shown in FIG. 1, the foldable display panel 10 includes a foldable area TA and a plurality of non-foldable areas PA located at both sides of the foldable area TA in a width direction (X direction in FIG. 1) of the foldable display panel 10. As shown in FIG. 2, the foldable display panel 10 transitions between an unfolded state and a folded state through bending of the foldable area TA.

Figure 3:
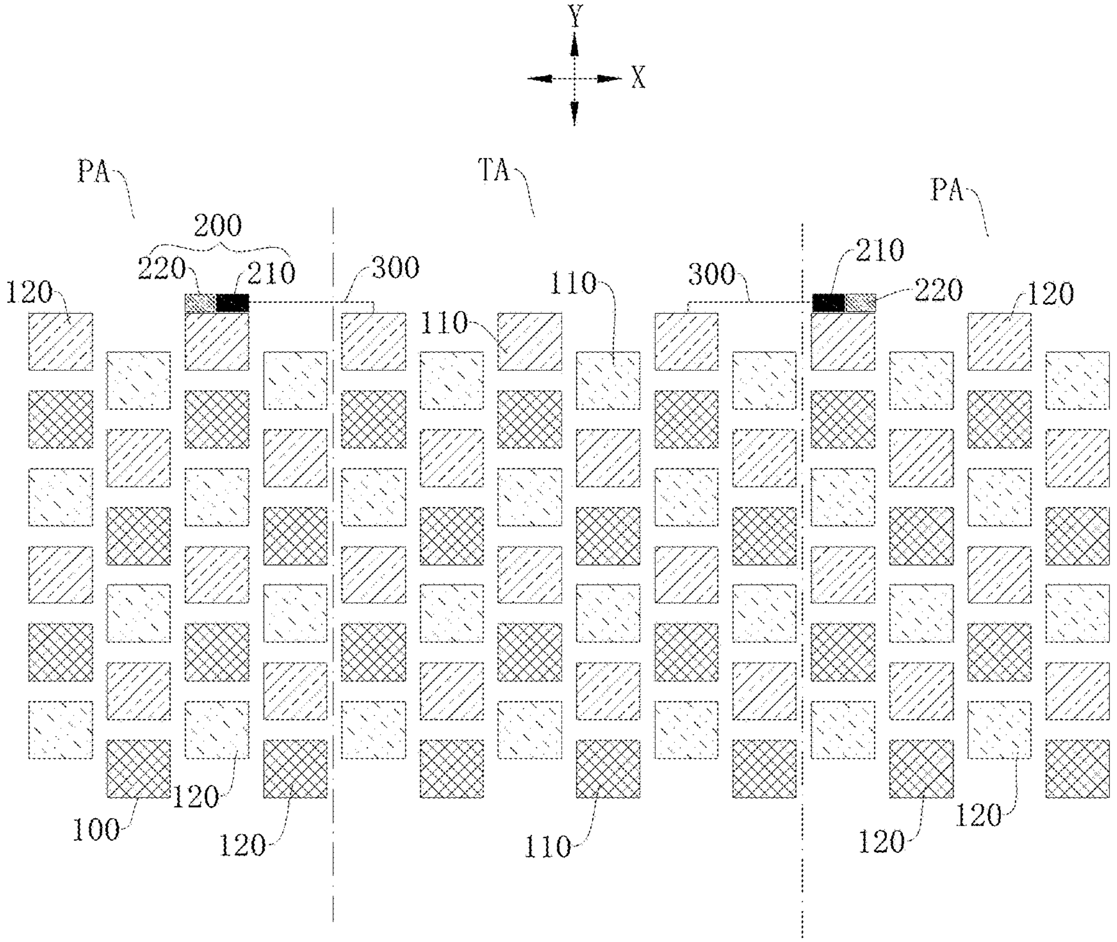
FIG. 3 is a schematic diagram of a partially enlarged structure at an area P in FIG. 1.

Please refer to FIGS. 1 and 3, FIG. 3 is a schematic diagram of a partially enlarged structure at an area Pin FIG. 1.

As shown in FIGS. 1 and 3, the foldable display panel 10 includes: a plurality of pixel groups 100, which includes a plurality of first pixel groups 110 located on the foldable area TA and a plurality of second pixel groups 120 located in the non-foldable areas PA; and a plurality of driver circuits 200 located in the non-foldable areas PA and for driving the plurality of pixel groups 100. The plurality of driver circuits 200 includes a plurality of first driver circuits 210 for driving the plurality of first pixel groups 110 and a plurality of second driver circuits 220 for driving the plurality of second pixel groups 120.

In the foldable display panel 10 provided according to the embodiments of the present application, the foldable display panel 10 includes the pixel groups 100 and the driver circuits 200, and the pixel groups 100 includes the first pixel groups 110 for providing display in the foldable area and the second pixel groups 120 for providing display in the non-foldable areas PA. The first driver circuits 210 and the second driver circuits 220 of the driver circuits 200 drive the first pixel groups 110 and the second pixel groups 120 to provide display, respectively. The first driver circuits 210 and the second driver circuits 220 are both located in the non-foldable areas PA. Since the foldable area TA is not provided with a driver circuit 200, it facilitates avoidance of fracture of the metal wirings in the foldable area TA and effectively improves the service life of the display panel.

The inventors have found that the driver circuit 200 usually includes stacked patterned metal layers, with inorganic insulation layers disposed therebetween. The inorganic insulation layers are not bending-resistant and prone to fracture. In the embodiments of the present application, the foldable area TA is not provided a driver circuit 200, so the foldable area TA is also free of inorganic insulation layers, which improves flexibility of the foldable area TA. Due to absence of the driver circuit 200 in the foldable area TA, there is a space left for providing an organic film layer inside the foldable area TA to further improve bending resistance and the service life of the foldable display panel 10.

In FIG. 3, only some individual first pixel groups 110 and their corresponding first driver circuits 210 as well as some individual second pixel groups 120 and their corresponding second driver circuits 220 are illustrated. In some embodiments, the first pixel groups 110 and the first driver circuits 210 may be provided in a one-to-one correspondence, where each of the first driver circuits 210 drives each of the first pixel groups 110; alternatively, the first driver circuits 210 and the first pixel groups 110 may be provided in a one-to-many correspondence, where a same first driver circuit 210 drives two or more first pixel groups 110 with the same color. In some embodiments, the second pixel groups 120 and the second driver circuits 220 may be provided in a one-to-one correspondence, where each of the second driver circuits 220 drives each of the second pixel groups 120; alternatively, the second driver circuits 220 and the second pixel groups 120 may be provided in a one-to-many correspondence, where a same second driver circuit 220 drives two or more second pixel groups 120 with the same color.

There are various ways to provide the first pixel group 110 and the second pixel group 120. For example, each of the first pixel group 110 and the second pixel group 120 includes a red sub-pixel, a green sub-pixel and a blue sub-pixel. In some other embodiments, the first pixel group 110 and the second pixel group 120 may also include a yellow sub-pixel, or the like.

Figure 4:
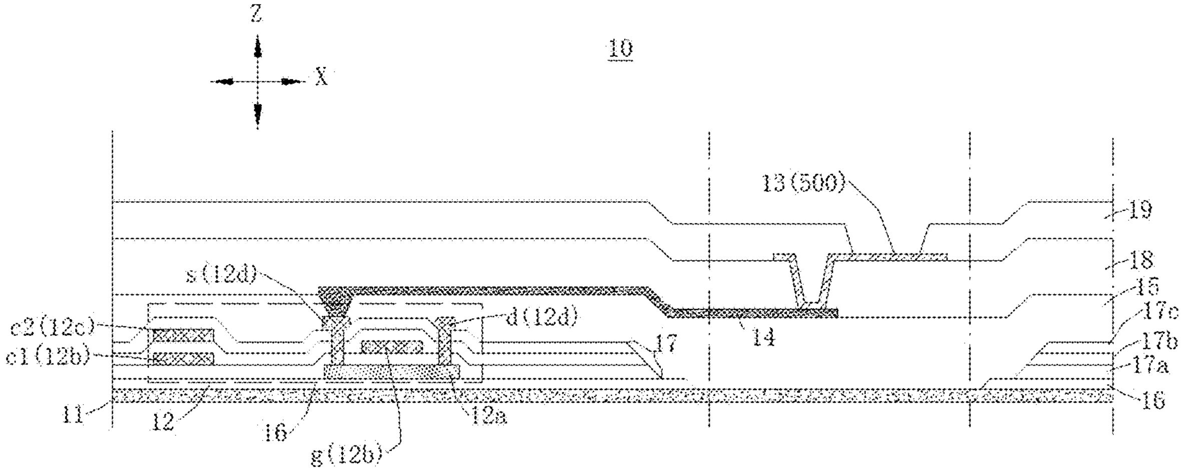
FIG. 4 is a schematic diagram of a layer structure of a foldable display panel according to an embodiment in the first aspect of the present application.

Please refer to FIGS. 3 and 4, FIG. 4 is a schematic diagram of a layer structure of a foldable display panel 10 according to an embodiment in the first aspect of the present application.

As shown in FIGS. 3 and 4, the layer structure of the foldable display panel 10 includes: a substrate 11; a driver device layer 12 located on the substrate 11, wherein the driver circuits 200 are disposed in the driver device layer 12; a first electrode layer 13 located at a side of the driver device layer 12 away from the substrate 11, wherein first electrode layer 13 includes a plurality of first electrodes 500 located in the foldable area TA and a plurality of second electrodes located in the non-foldable areas PA (not shown in the figure); and a connection line layer 14 located between the first electrode layer 13 and the driver device layer 12, wherein the connection line layer 14 includes first connection lines 300, through which the first driver circuits 210 are connected to the plurality of first electrodes 500 respectively.

In these embodiments, by adding the connection line layer 14, it is able to achieve connection between the first electrodes 500 located in the foldable area TA and the first driver circuits 210 located in the non-foldable areas PA. The connection line layer 14 is a metal wiring layer, which can ensure that the foldable area TA has good bending resistance.

In some embodiments, the foldable display panel 10 may further include a first inorganic insulation layer 16 located at a side of the driver device layer 12 faced to the substrate 11.

There are various ways to provide the driver device layer 12. For example, as shown in FIG. 4, the driver device layer

12 includes an active layer 12*a* and a plurality of conduction layers, wherein the a plurality of conduction layers including a first conduction layer 12*b*, a second conduction layer 12*c* and a third conduction layer 12*d*. A second inorganic insulation layer 17 is provided between the active layer 12*a* and the first conduction layer 12*b*, as well as between adjacent ones of the conduction layers. Exemplarily, the driver circuit 200 includes a transistor T and a storage capacitor C. The transistor T includes a semiconductor b, a gate electrode g, a source electrode s, and a drain electrode d. The storage capacitor C includes a first electrode plate c1 and a second electrode plate c2. As an example, the gate electrode g and first electrode plate c1 may be located on the first conduction layer 12*b*, the second electrode plate c2 may be located on the second conduction layer 12*c*, and the source electrode s and the drain electrode d may be located on the third conduction layer 12*d*. In some embodiments, the driver device layer 12 may further include at least one of a data signal line (Data line), a power signal line (VDD line), a reference voltage signal line (Vref line), a scan signal line (Scan line), and a light-emission control signal line (Emit line).

In some embodiments, the foldable display panel 10 may further include a controller (not shown in the figure) configured to control the foldable area TA and the non-foldable areas PA to display independently. For example, the controller is configured to control the first driver circuits 210 and the second driver circuits 220 to operate independently. Due to different layer structures of the foldable area TA and non-foldable areas PA, the controlling of the foldable area TA and non-foldable area PA to display independent through the controller can improve overall display effects of the foldable display panel 10. For example, the foldable display panel 10 may use a dual gamma system, and the controller may control data signal lines of the foldable area TA and the non-foldable areas PA independently.

In some embodiments, the second inorganic insulation layer 17 may include one or more layers. For example, the second inorganic insulation layer 17 may include a first layer 17*a*, a second layer 17*b*, and a third layer 17*c*. The first layer 17*a* is located between the active layer 12*a* and the first conduction layer 12*b*, the second layer 17*b* is located between the first conduction layer 12*b* and the second conduction layer 12*c*, and the third layer 17*c* is located between the second conduction layer 12*c* and the third conduction layer 12*d*.

Due to absence of a driver circuit 200 in the foldable area TA, the first conduction layer 12*b*, the second conduction layer 12*c*, and the third conduction layer 12*d* in the foldable area TA can be subjected to a hole-digging process. There is no need for mutual insulation between the first conduction layer 12*b*, the second conduction layer 12*c* and the third conduction layer 12*d* in the foldable area TA, so the second inorganic insulation layer 17 can also be subjected to a hole-digging process in the foldable area TA. The holes on the first conduction layer 12*b*, second conduction layer 12*c*, and third conduction layer 12*d*, as well as the holes on the second inorganic insulation layer 17, form a plurality of first through holes in the driver device layer 12, that is, the driver device layer 12 includes the plurality of first through holes in the foldable area TA.

In some embodiments, the foldable display panel 10 may further includes a first flattened layer 15 located between the driver device layer 12 and the connection line layer 14. In the case where the driver device layer 12 include the plurality of first through holes, at least a part of the first flattened layer 15 is filled in the plurality of the first through holes. In these embodiments, since the second inorganic insulation layer 17 is subjected to a hole-digging process in the foldable area TA, it can effectively improve the bending resistance of the foldable area TA.

In some embodiments, in order to further improve the bending resistance of the foldable area TA, the first inorganic insulation layer 16 may include second through holes located in the foldable area TA, wherein the second through holes are connected to the first through holes, and at least a part of the first flattened layer 15 is filled in the second through holes.

In these embodiments, the first inorganic insulation layer 16 is subjected to a hole-digging process to form the second through holes on the first inorganic insulation layer 16, which reduces a spread area of the second inorganic insulation layer 17 in the foldable area TA, and further improve the bending resistance of the foldable area TA.

The first inorganic insulation layer 16 may include, for example, a silicon oxide layer and/or a silicon nitride layer, and the second inorganic insulation layer 17 may include, for example, a silicon oxide layer and/or a silicon nitride layer.

In some embodiments, the foldable display panel 10 may further includes a second flattened layer 18 located between the connection line layer 14 and the first electrode layer 13; and a pixel definition layer 19 located at a side of the first electrode layer 13 away from the connection line layer 14. The pixel definition layer 19 includes a body part and pixel openings, wherein the first electrodes 500 and the second electrodes are disposed corresponding to the respective pixel openings. The pixel opening are provided to be filled with light-emitting materials to achieve light-emission for display of the foldable display panel 10.

Figure 5:
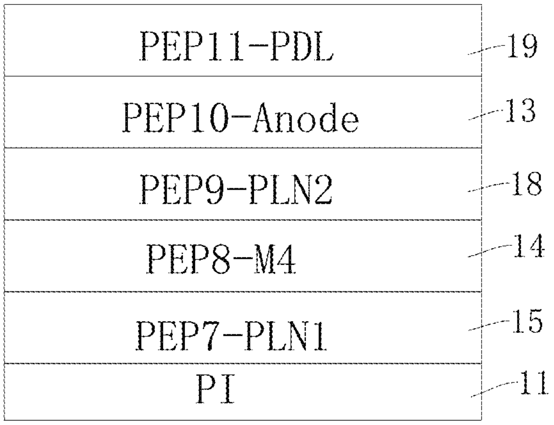
FIG. 5 is a schematic diagram of a layer structure of a foldable area of a foldable display panel according to an embodiment in the first aspect of the present application.
Figure 6:
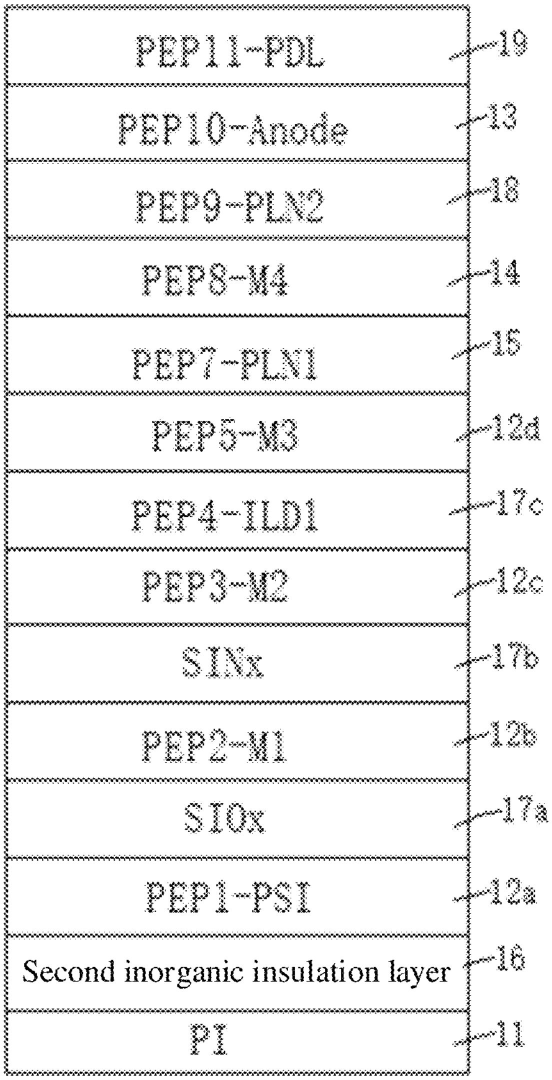
FIG. 6 is a schematic diagram of a layer structure of a non-foldable area of a foldable display panel according to an embodiment in the first aspect of the present application.

Please refer to FIGS. 5 and 6, FIG. 5 is a schematic diagram of a layer structure of a foldable area TA of a foldable display panel 10 according to an embodiment in the first aspect of the present application, and FIG. 6 is a schematic diagram of a layer structure of a non-foldable area PA of a foldable display panel 10 according to an embodiment in the first aspect of the present application.

As shown in FIGS. 5 and 6, in some embodiments, the foldable area TA includes a substrate (PI) 11, a first flattened layer (PEP7-PLN1) 15, a connection line layer (PEP8-M4) 14, a second flattened layer (PEP9-PLN2) 18, a first electrode layer (PEP1-Anode) 13, and a pixel definition layer (PEP11-PDL) 19. The foldable area TA includes a relatively small number of layers in the structure, so has better bending resistance. The non-foldable display area includes a substrate (PI) 11, a first inorganic insulation layer 16, an active layer (PEP1-PSI) 12*a*, a first layer (SIOx) 17*a*, a first conduction layer (PEP2-M1) 12*b*, a second layer (SINx) 17*b*, a second conduction layer (PEP3-M2) 12*c*, a third layer (PEP4-ILD1) 17*c*, a third conduction layer (PEP5-M3) 12*d*, a first flattened layer (PEP 7-PLN1) 15, a connection line layer (PEP8-M4) 14, a second flattened layer (PEP9-PLN2) 18, a first electrode layer (PEP10-Anode) 13, and a pixel definition layer (PEP11-PLD) 19.

Figure 7:
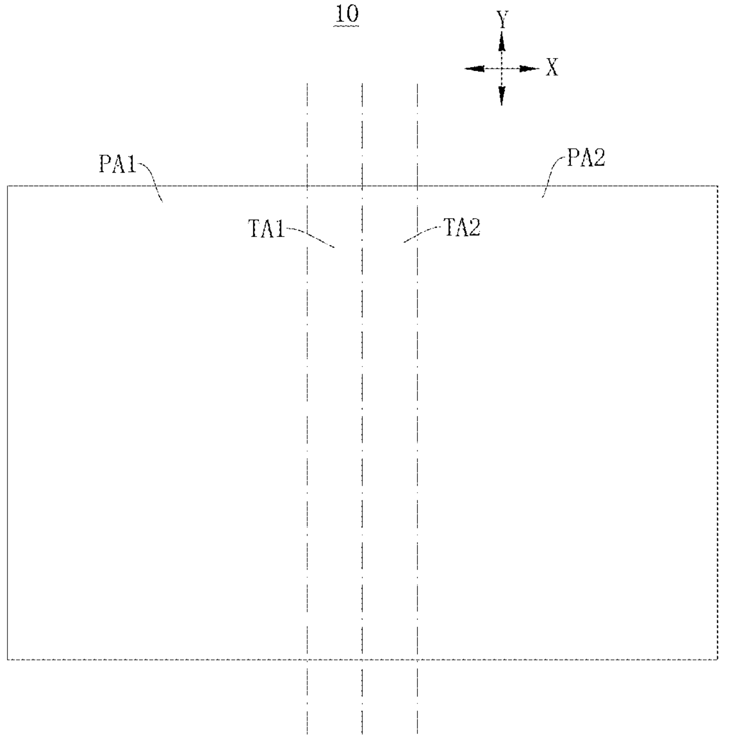
FIG. 7 is a structural schematic diagram of a foldable display panel in an unfolded state according to another embodiment in the first aspect of the present application.

Please refer to FIGS. 3 and 7. FIG. 7 is a structural schematic diagram of a foldable display panel 10 in an unfolded state according to another embodiment in the first aspect of the present application.

As shown in FIGS. 3 and 7, in some embodiments, the non-foldable areas PA include a first non-foldable area PA1 and a second non-foldable area PA2 located at both sides of the foldable area TA, and the plurality of first driver circuits 210 are located at the first non-foldable area PA1 and the second non-foldable area PA2. The first non-foldable area PA1 and the second non-foldable area PA2 are both equipped with a first driver circuit 210, which can improve uniformity of display effects of the first non-foldable area PA1 and the second non-foldable area PA2, and reduce display color deviation of the foldable display panel 10 and thereby improve display effects of the foldable display panel 10.

In some embodiments, as shown in FIGS. 3 and 7, the foldable area TA may include a first foldable area TA1 and a second foldable area TA2 which are disposed side by side along the width direction, wherein the first foldable area TA1 is adjacent to the first non-foldable area PA1, and the second foldable area TA2 is adjacent to the second non-foldable area PA2; the first pixel groups 110 include first sub-pixels located in the first foldable area TA1 and second sub-pixels located in the second foldable area TA2; and the first driver circuits 210 include first sub-circuits for driving the first sub-pixels and second sub-circuits for driving the second sub-pixels. The first sub-circuits are located in the first non-foldable area PA1, and the second sub-circuits are located in the second non-foldable area PA2.

In these embodiments, the first sub-circuits are provided for driving the first sub-pixels, the first sub-circuits are located in the first non-foldable area PA1, and the first sub-pixels are located in the first foldable area TA1, which can reduce a spacing between the first sub-circuits and the first sub-pixels, and in turn reduce an extension length of the first connection line 300. Similarly, the second sub-circuits are provided for driving the second sub-pixels, the second sub-circuits are located in the second non-foldable area PA2 and the second sub-pixels are located in the second foldable area TA2, which can reduce a spacing between the second sub-circuits and the second sub-pixels, and in turn reduce an extension length of the first connection line 300. The structure of the foldable display panel 10 is then simplified and efficiency for preparing the foldable display panel 10 can be improved.

There are various extension dimensions for the first foldable area TA1 and the second foldable area TA2. In some embodiments, along the width direction, an extension size of the first foldable area TA1 and/or the second foldable area TA2 may be half of an extension size of the foldable area TA. Let the first foldable area TA1 and the second foldable areas TA2 include the same number of the first sub-pixels and the second sub-pixels and the same number of first sub-circuits and the second sub-circuits, that is, the number of the first sub-circuits in the first non-foldable area PA1 equals to the number of the second sub-circuits in the second non-foldable area PA2, display difference between the first non-foldable area PA1 and the second non-foldable area PA2 can be further reduced, and display color deviation of the foldable display panel 10 can thus be reduced and then display effects of the foldable display panel 10 can be improved.

In some embodiments, the first sub-circuits are uniformly distributed in the first non-foldable area PA1, resulting in a more uniform display of the first non-foldable area PA1, which reduces display color deviation of the first non-foldable area PA1 itself.

In some embodiments, the second sub-circuits are uniformly distributed in the second non-foldable area PA2, resulting in a more uniform display of the second non-foldable area PA2, which improves display color deviation of the second non-foldable area PA2 itself.

Figure 8:
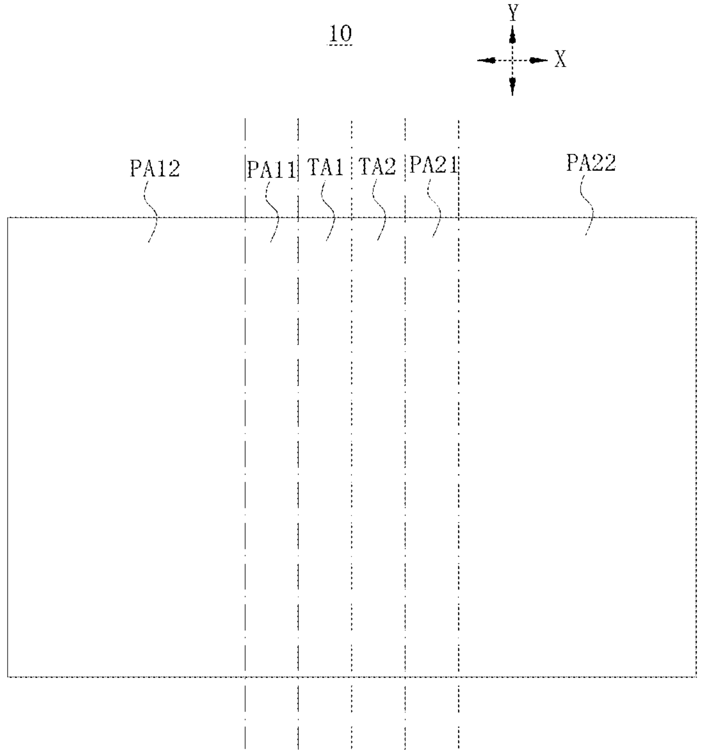
FIG. 8 is a structural schematic diagram of a foldable display panel in an unfolded state according to yet another embodiment in the first aspect of the present application.

Please refer to FIGS. 3 and 8, FIG. 8 is a structural schematic diagram of a foldable display panel 10 in an unfolded state according to another embodiment in the first aspect of the present application.

In some other embodiments, the first non-foldable area PA1 includes a first transition area PA11 adjacent to the first foldable area TA1, and a first main display area PA12 located at a side of the first transition area PA11 away from the first foldable area TA1. The first sub-circuits are located in the first transition area PA11.

In these embodiments, the first sub-circuits are located in the first transition area PA11 which is closer to the first foldable area TA1, which can reduce a spacing between the first sub-pixels and the first sub-circuits, and in turn reduce an extension length of the first connection line 300, and thereby facilities avoidance of fracture of the first connection line 300 caused by bending.

In some embodiments, the second pixel groups 120 include first transition sub-pixels located in the first transition area PA11, the second driver circuits 220 include first transition circuits for driving the first transition sub-pixels, and the first transition circuits are located in the first transition area PA11. In these embodiments, both the first transition circuits for driving the local sub-pixels and the first sub-circuits for driving the first sub-pixels in the foldable area TA are provided in the first transition area PA11.

In some embodiments, the second pixel groups 120 include first main sub-pixels located in the first main display area PA12, the second driver circuits 220 include first main circuits for driving the first main sub-pixels, and the first main circuits are located in the first main display area PA12.

In some other embodiments, the second non-foldable area PA2 may include a second transition area PA21 adjacent to the second foldable area TA2, and a second main display area PA22 located at a side of the second transition area PA21 away from the second foldable area TA2, wherein the second sub-circuits are located in the second transition area PA21.

In these embodiments, the second sub-circuits are located in the second transition area PA21 which is closer to the second foldable area TA2, which can reduce a spacing between the second sub-pixels and the second sub-circuits, and in turn reduce an extension length of the first connection line 300, and thereby facilities avoidance of fracture of the first connection line 300 caused by bending.

In some embodiments, the second pixel groups 120 include second transition sub-pixels located in the second transition area PA21, the second driver circuits 220 include second transition circuits for driving the second transition sub-pixels, and the second transition circuits are located in the second transition area PA21. In these embodiments, both the second transition circuits for driving the local sub-pixels, as well as the second sub-circuits for driving the second sub-pixels of the foldable area TA are provided in the second transition area PA21.

In some embodiments, the second pixel groups 120 include second main sub-pixels located in the second main display area PA22, the second driver circuits 220 include second main circuits for driving the second main sub-pixels, and the second main circuits are located in the second main display area PA22.

Figure 9:
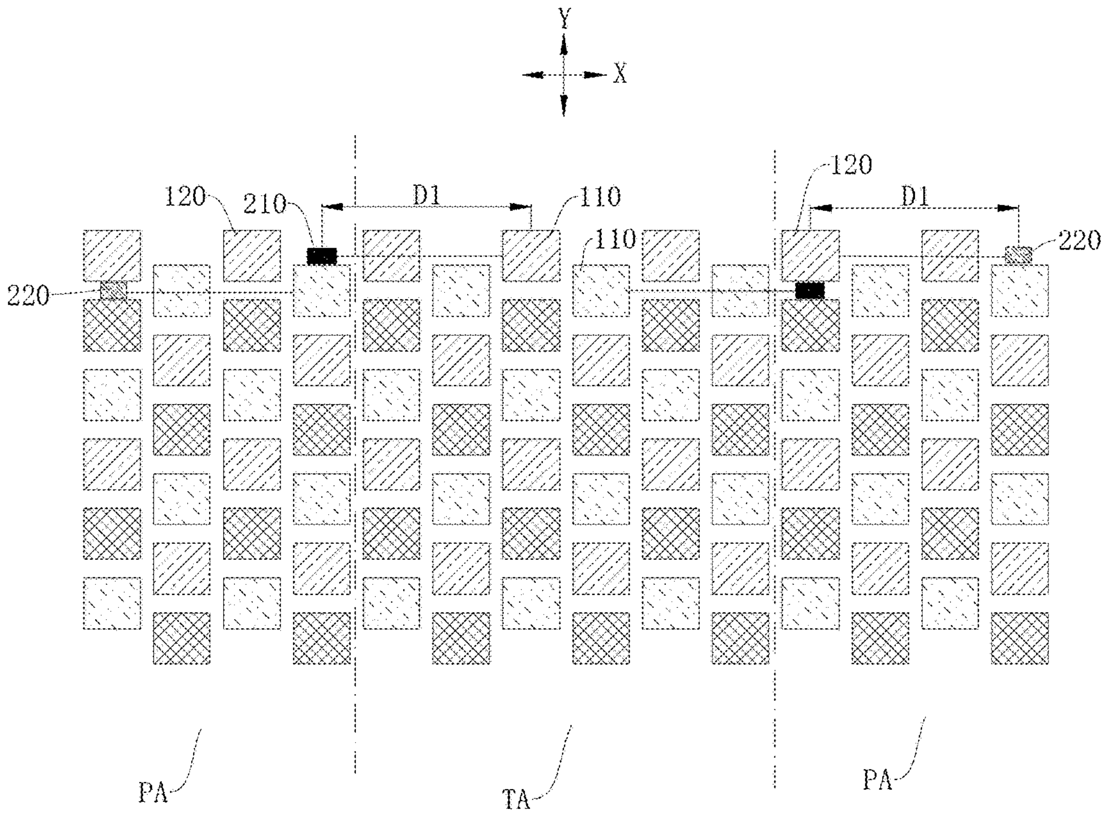
FIG. 9 is a schematic diagram of a partially enlarged structure at the area P in FIG. 1 according to another embodiment.
Figure 10:
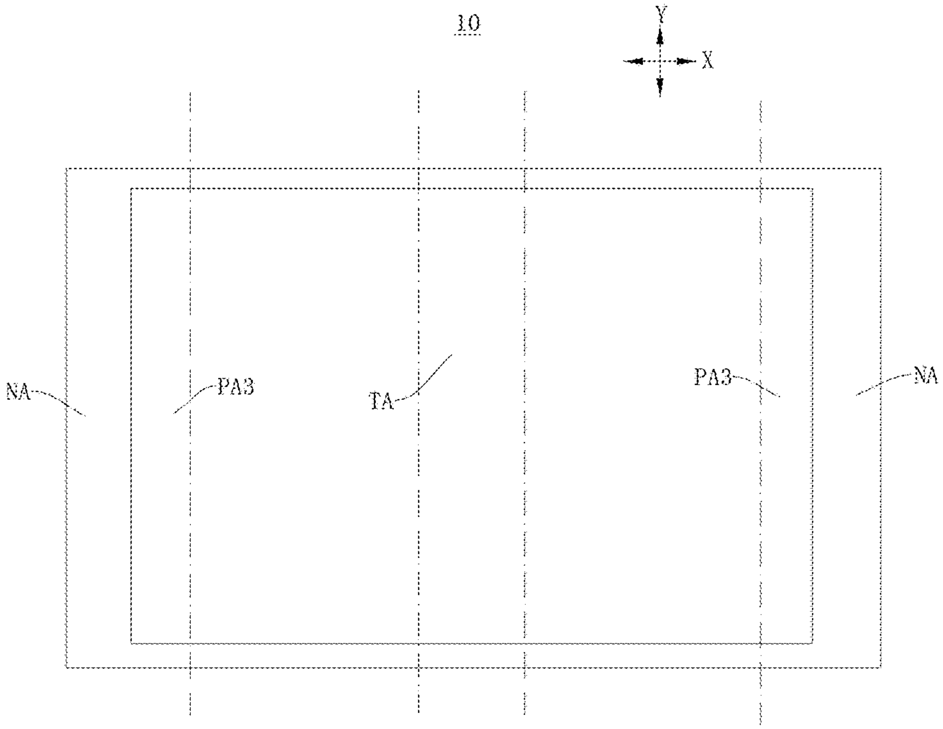
FIG. 10 is a structural schematic diagram of a foldable display panel in an unfolded state according to another embodiment in the first aspect of the present application.

Please refer to FIGS. 9 and 10, FIG. 9 is a schematic diagram of a partially enlarged structure at the area P in FIG. 1 according to another embodiment. FIG. 10 is a structural schematic diagram of a foldable display panel 10 in an unfolded state according to another embodiment in the first aspect of the present application. In FIG. 9, only some individual first pixel groups 110 and their connected first driver circuits 210 as well as some individual second pixel groups 120 and their connected second driver circuits.

In some alternative embodiments, each of the driver circuits 200 and a pixel group 100 driven by the driver circuit are displaced along the width direction. That is, each of the first driver circuits 210 and a first pixel group 110 driven by the first driver circuit 210 are displaced along the width direction, and each of the second driver circuits 220 and a second pixel group 120 driven by the second driver circuit 220 are displaced along the width direction.

In these embodiments, since each of the driver circuits 200 and a pixel group 100 driven by the driver circuits are displaced along the width direction, it reduces a distribution density of the driver circuits 200 in the non-foldable area PA, and reduces an influence on display of the non-foldable area PA caused by setting the first driver circuits 210 in the non-foldable area PA.

In some embodiments, the connection line layer 14 may further includes second connection lines 400 for connecting the second electrodes and the second driver circuits 220, respectively.

For example, there is a first spacing D1 between each of the driver circuits 200 and a pixel group 100 driven by the driver circuit 200 in the width direction. Values of the first spacing D1 corresponding to different pixel groups 100 may be the same or different. For example, the values of the first spacing D1 corresponding to pixel groups 100 in a same column may be the same, while the values of the first spacing D1 corresponding to pixel groups 100 in different columns may be different, and in a direction from the foldable area TA to its adjacent non-foldable area PA, the value of the first spacing D1 gradually decreases, so that the non-foldable area PA can accommodate the first driver circuits 210 and the second driver circuits 220, and the first driver circuit 210 and the second driver circuit 220 can be uniformly distributed in the non-foldable area PA.

For example, the driver circuits 200 corresponding to a same column of pixel groups 100 may be disposed in a same column, where the first non-foldable area PA1 and/or the second non-foldable area PA2 includes N columns of second sub-pixels, the first foldable area TA1 and/or the second foldable area TA2 includes M columns of first sub-pixels, the first non-foldable area PA1 and/or the second non-foldable area PA2 includes M+N columns of driver circuits 200, and the M+N columns of driver circuits 200 are uniformly distributed in the first non-foldable area PA1 and/or the second non-foldable area PA2. The column direction is the Y direction shown in FIG. 9.

In some other embodiments, spacings between the driver circuits 200 and the pixel groups 100 driven by the respective driver circuits may be the same, that is, a value of the first spacing D1 corresponding to the first sub-pixel is the same as a value of the first spacing D1 corresponding to the second sub-pixel.

For example, along the width direction, the first spacing D1 between each of the driver circuits 200 and a pixel group 100 driven by the driver circuit 200 may be half of the foldable area TA, which ensures the driver circuits 200 maintains their original distribution density without affecting display effects of the foldable display panel 10.

In some embodiments, each of the non-foldable areas PA includes a non-display area NA at a side away from the foldable area TA, and at least a portion of the driver circuits 200 are located in the non-display area NA. By providing a portion of the driver circuits 200 in the non-display area NA, it can ensure that the driver circuits 200 maintains their original distribution density.

In some embodiments, each of the non-foldable areas PA includes an edge display area PA3 adjacent to the non-display area NA. The driver circuits 200 for driving pixel groups 100 within the edge display area PA3 are located in the non-display area NA, which can reduce a spacing between the driver circuits 200 located in the non-display area NA and the second sub-pixels driven by the driver circuits 200, and reduce an extension length of the second connection line 400.

In some embodiments, along the width direction, an extension width of the edge display area PA3 is half of an extension width of the foldable area TA, which can ensure that the non-foldable area PA and non-display area NA include uniformly distributed driver circuits 200.

In a second aspect, the embodiments of the present application provides a display device, including the foldable display panel 10 according to any one of the embodiments in the first aspect described above. Due to the fact that the display device according the embodiments in the second aspect of the application includes the foldable display panel 10 according to any one of the embodiments in the first aspect described above, the display device according the embodiments in the second aspect of the application achieve the same beneficial effects as the foldable display panel 10 according to any one of the embodiments in the first aspect described above, which will not be repeated here.

The display device according to the embodiments of the present application may include but is not limited to a device with display function such as a mobile phone, a Personal Digital Assistants (PDAs), a tablet, an e-book, a television, an access control, a smart landlines, a consoles, etc.

Figure 11:
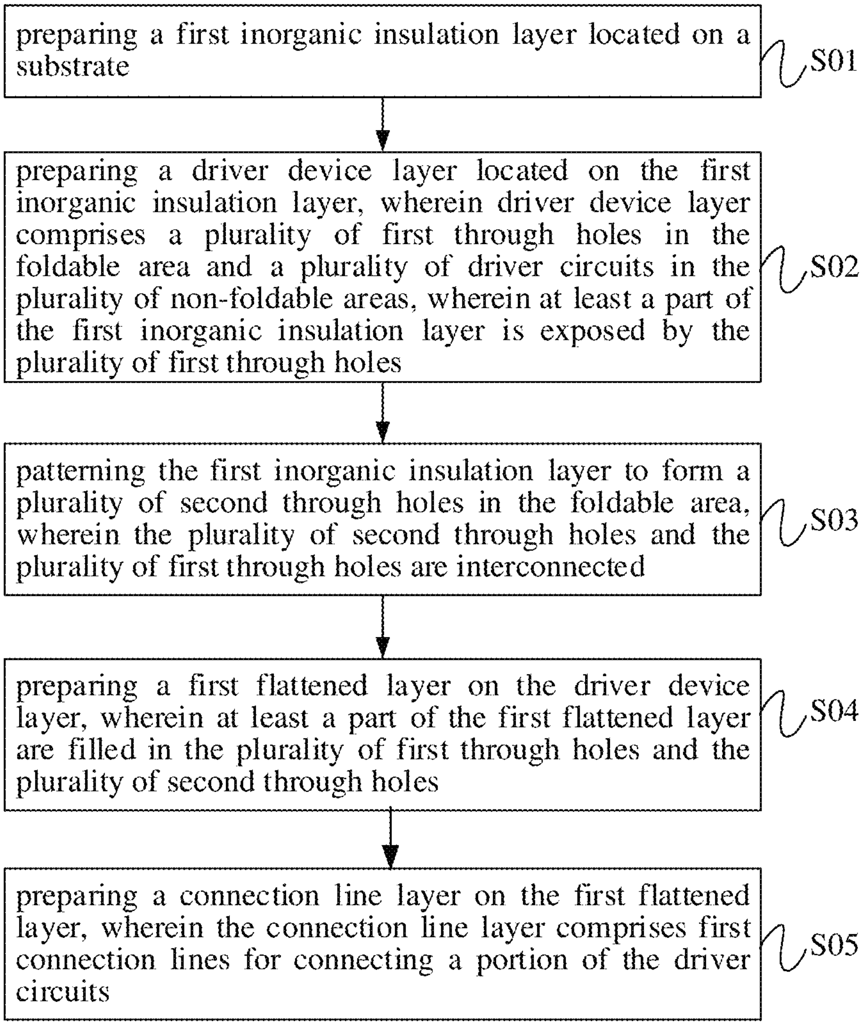
FIG. 11 is a flowchart of a method for preparing a foldable display panel according to an embodiment in a third aspect of the present application.

Please refer to FIG. 11, which is a flowchart of a method for preparing a foldable display panel 10 according to an embodiment in the third aspect of the present application.

The foldable display panel 10 may be the foldable display panel 10 any one of the embodiments in the first aspect described above. Please refer to FIGS. 1 to 11, the method for preparing the foldable display panel 10 includes:

Step S01: preparing a first inorganic insulation layer 16 located on a substrate 11;

Step S02: preparing a driver device layer 12 located on the first inorganic insulation layer 16, wherein the driver device layer 12 includes a plurality of first through holes in the foldable area TA and a plurality of driver circuits 200 in the plurality of non-foldable area PA, and a part of the first inorganic insulation layer 16 is exposed from the first through holes;

Step S03: patterning the first inorganic insulation layer 16 to form a plurality of second through holes in the foldable area TA, wherein the plurality of second through holes and the plurality of first through holes are interconnected;

Step S04: preparing a first flattened layer 15 on the driver device layer 12, wherein a part of the first flattened layer 15 is filled in the plurality of first through holes and the plurality of second through holes; and Step S05: preparing a connection line layer 14 on the first flattened layer 15, wherein the connection line layer 14 includes first connection lines 300 for connecting a portion of the driver circuits 200.

In the method for preparing the foldable display panel 10 according to the embodiments of the present application, since the foldable area TA is not provided with a driver circuit 200, it facilitates avoidance of fracture of the metal wirings in the foldable area TA and effectively improves the service life of the display panel.

In some embodiments, there are various ways for implementing the step S02. As an example, the driver device layer 12 may include an active layer 12*a*, a first conduction layer 12*b*, a second conduction layer 12*c*, and a third conduction layer 12*d*. Second inorganic insulation layers 17 are provided between the active layer 12*a* and the first conduction layer 12*b*, as well as between adjacent conduction layers. The driver circuit 200 includes a transistor T and a storage capacitor C. The transistor T includes a semiconductor b, a gate g, a source s, and a drain d. The storage capacitor C includes a first electrode plate c1 and a second electrode plate c2. The gate electrode g and the first electrode plate c1 may be located on the first conduction layer 12*b*, the second electrode plate c2 may be located on the second conduction layer 12*c*, and the source electrode s and drain electrode d may be located on the third conduction layer 12*d*. The second inorganic insulation layers 17 include a first layer 17*a*, a second layer 17*b*, and a third layer 17*c*.

Figure 12:
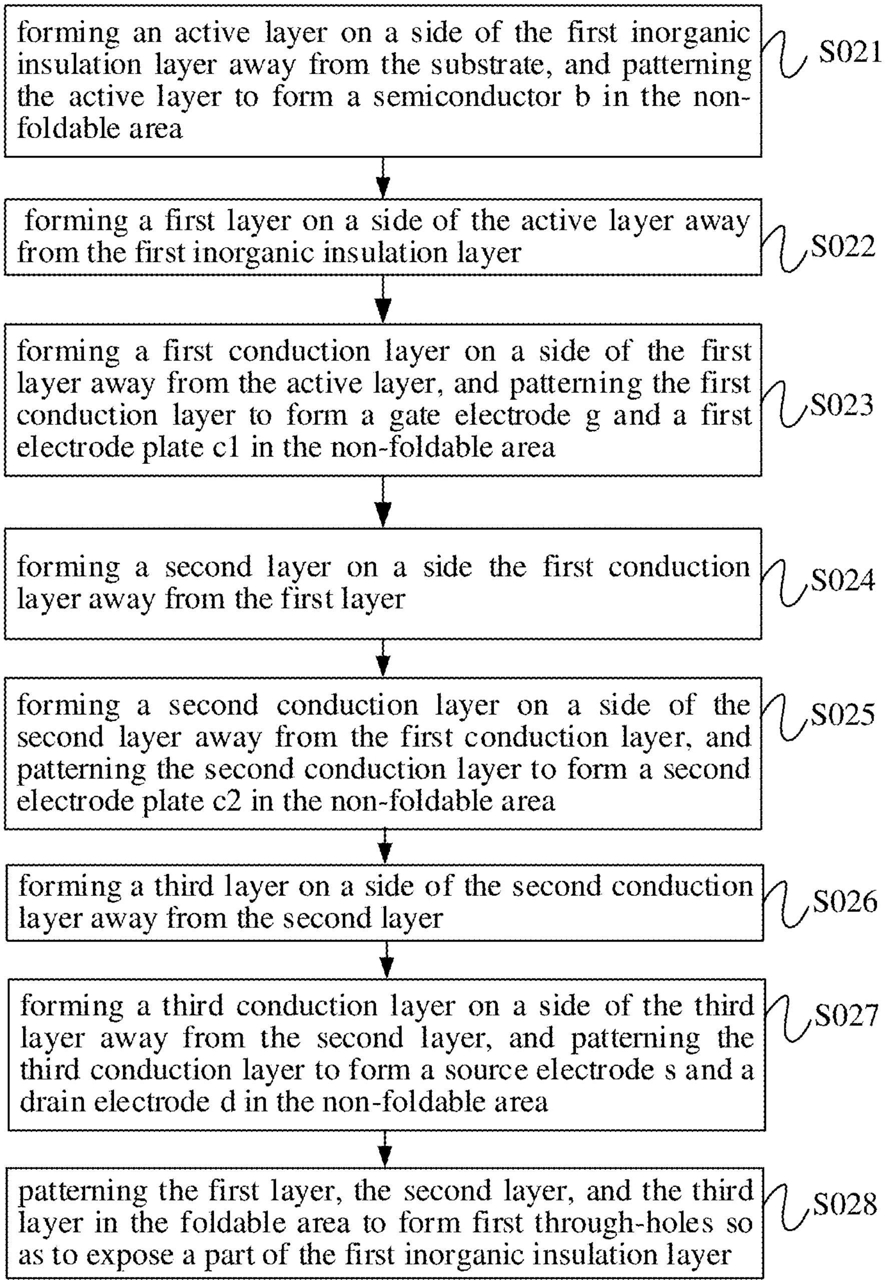
FIG. 12 is a flowchart of a method for preparing a foldable display panel according to another embodiment in the third aspect of the present application.

As shown in FIG. 12, FIG. 12 is a flowchart illustrating a method for preparing a foldable display panel 10 according to another embodiment in the third aspect of the present application. In FIG. 12, step S02 includes:

Step S021: forming an active layer 12*a* at a side of the first inorganic insulation layer 16 away from the substrate 11, and patterning the active layer 12*a* to form a semiconductor b in the non-foldable area PA;

Step S022: forming a first layer 17*a* at a side of the active layer 12*a* away from the first inorganic insulation layer 16;

Step S023: forming a first conduction layer 12*b* at a side of the first layer 17*a* away from the active layer 12*a*, and patterning the first conduction layer 12*b* to form a gate electrode g and a first electrode plate c1 in the non-foldable area PA;

Step S024: forming a second layer 17*b* at a side the first conduction layer 12*b* away from the first layer 17*a;*

Step S025: forming a second conduction layer at a side of the second layer 17*b* away from the first conduction layer 12*b*, and patterning the second conduction layer 12*c* to form a second electrode plate c2 in the non-foldable area PA;

Step S026: forming a third layer 17*c* at a side of the second conduction layer 12*c* away from the second layer 17*b;*

Step S027: forming a third conduction layer 12*d* at a side of the third layer 17*c* away from the second layer 17*b*, and patterning the third conduction layer 12*d* to form a source electrode s and a drain electrode d in the non-foldable area PA; and Step S028: patterning the first layer 17*a*, the second layer 17*b*, and the third layer 17*c* in the foldable area TA to form first through-holes so as to expose a part of the first inorganic insulation layer 16.

Since the second inorganic insulation layer 17 in the foldable area TA are provided with the first through-holes, a distribution area of the second inorganic insulation layer 17 in the foldable area TA can be reduced, thereby bending resistance of the foldable area TA can be improved. Since the first inorganic insulation layer 16 in the foldable area TA are provided with the second through-holes, a distribute area of the first inorganic insulation layer 16 in the foldable area TA can be reduced, thereby bending resistance of the foldable area TA can be improved.

Although the present application has been described with reference to preferred embodiments, various improvements can be made and components can be replaced with equivalents without departing from the scope of the present application. Especially, as long as there is no structural conflict, the various technical features mentioned in each embodiment can be combined in any way. The present application is not limited to the specific embodiments disclosed in the text, but includes all technical solutions falling within the scope of the claims.

What is claimed is:

1. A foldable display panel comprising:

a foldable area and a plurality of non-foldable areas located at both sides of the foldable area in a width direction of the foldable display panel;

a plurality of pixel groups, comprising a plurality of first pixel groups located in the foldable area and a plurality of second pixel groups located in the plurality of non-foldable areas; and a plurality of driver circuits located in the plurality of non-foldable areas and for driving the plurality of pixel groups, wherein the plurality of driver circuits comprises a plurality of first driver circuits for driving the plurality of first pixel groups and a plurality of second driver circuits for driving the plurality of second pixel groups, each pixel group of the plurality of pixel groups comprises sub-pixels of different colors which are arranged in columns, the driver circuits of the plurality of driver circuits corresponding to a same column of sub-pixels are disposed in a same column, and each driver circuit of the plurality of driver circuits is located between two adjacent sub-pixels of the plurality of second pixel groups in a same column.

2. The foldable display panel according to claim 1, further comprising:

a substrate;

a driver device layer located on the substrate, wherein the driver circuits are disposed in the driver device layer;

a first electrode layer located at a side of the driver device layer away from the substrate, wherein the first electrode layer comprises a plurality of first electrodes located in the foldable area and a plurality of second electrodes located in the non-foldable areas; and a connection line layer located between the first electrode layer and the driver device layer, wherein the connection line layer comprises first connection lines, through which the first driver circuits are connected to the plurality of first electrodes respectively.

3. The foldable display panel according to claim 2, further comprising:

a first flattened layer located between the driver device layer and the connection line layer;

wherein the driver device layer comprises a plurality of first through holes located in the foldable area, and at least a part of the first flattened layer is filled in the plurality of first through holes.

4. The foldable display panel according to claim 3, further comprising:

a first inorganic insulation layer located at a side of the driver device layer faced to the substrate, wherein the first inorganic insulation layer comprises second through holes located in the foldable area, the second through holes are connected to the first through holes, and at least a part of the first flattened layer is filled in the second through holes.

5. The foldable display panel according to claim 4, wherein the driver device layer comprises an active layer and a plurality of conduction layers, and a second inorganic insulation layer is provided between the active layer and the conduction layers as well as between adjacent ones of the conduction layers.

6. The foldable display panel according to claim 3, further comprising:

a second flattened layer and a pixel definition layer, wherein the second flattened layer is located between the connection line layer and the first electrode layer, and the pixel definition layer is located at a side of the first electrode layer away from the connection line layer and comprises a body part and pixel openings, wherein the first electrodes and the second electrodes are disposed corresponding to the respective pixel openings, and the pixel openings are provided to be filled with light-emitting materials.

7. The foldable display panel according to claim 2, wherein each of the driver circuits and a pixel group driven by the driver circuit are displaced along the width direction; and the connection line layer further comprises second connection lines for connecting the second electrodes and the second driver circuits respectively.

8. The foldable display panel according to claim 7, wherein there is a first spacing between each of the driver circuits and a pixel group driven by the driver circuit, and a value of the first spacing gradually decreases in a direction from the foldable area to the non-foldable area adjacent to the foldable area.

9. The foldable display panel according to claim 7, wherein along the width direction, each of the driver circuits and a pixel group driven by the driver circuit has a spacing therebetween and each said spacing is half of the foldable area, spacings between each of the second pixel groups in the non-foldable area and a driver circuit driving the second pixel group in the non-foldable area are the same, and spacings between each of the first pixel groups in the foldable area and a driver circuit driving the first pixel group in the non-foldable area are the same.

10. The foldable display panel according to claim 9, wherein each of the non-foldable areas comprises an edge display area adjacent to a non-display area, and driver circuits for driving pixel groups within the edge display area are located in the non-display area.

11. The foldable display panel according to claim 1, wherein the foldable area comprises a first foldable area and a second foldable area which are disposed side by side along the width direction, and the non-foldable areas comprise a first non-foldable area adjacent to the first foldable area and a second non-foldable area adjacent to the second foldable area;

the first pixel groups comprise first sub-pixels located in the first foldable area and second sub-pixels located in the second foldable area; and the first driver circuits comprise first sub-circuits for driving the first sub-pixels and second sub-circuits for driving the second sub-pixels, wherein the first sub-circuits are located in the first non-foldable area, and the second sub-circuits are located in the second non-foldable area.

12. The foldable display panel according to claim 11, wherein along the width direction, an extension size of the first foldable area and/or second foldable area is half of an extension size of the foldable area.

13. The foldable display panel according to claim 11, wherein the first sub-circuits are uniformly distributed in the first non-foldable area and the second sub-circuits are uniformly distributed in the second non-foldable area.

14. The foldable display panel according to claim 11, wherein the first non-foldable area comprises a first transition area adjacent to the first foldable area and a first main display area located at a side of the first transition area away from the first foldable area, and wherein the first sub-circuits are located in the first transition area.

15. The foldable display panel according to claim 14, wherein the second pixel groups comprise first transition sub-pixels located in the first transition area, the second driver circuits comprise first transition circuits for driving the first transition sub-pixels, and the first transition circuits are located in the first transition area; and the second pixel groups comprise first main sub-pixels located in the first main display area, the second driver circuits comprise first main circuits for driving the first main sub-pixels, and the first main circuits are located in the first main display area.

16. The foldable display panel according to claim 11, wherein, the second non-foldable area comprises a second transition area adjacent to the second foldable area and a second main display area located at a side of the second transition area away from the second foldable area, and wherein the second sub-circuits are located in the second transition area.

17. The foldable display panel according to claim 16, wherein the second pixel groups comprise second transition sub-pixels located in the second transition area, the second driver circuits comprise second transition circuits for driving the second transition sub-pixels, and the second transition circuits are located in the second transition area.

18. The foldable display panel according to claim 16, wherein the second pixel groups comprise second main sub-pixels located in the second main display area, the second driver circuits comprise second main circuits for driving the second main sub-pixels, and the second main circuits are located in the second main display area.

19. The foldable display panel according to claim 1, wherein the driver circuits are not disposed in the foldable area.

* * * * *